United States Patent
Rakuff et al.

(10) Patent No.: US 11,599,103 B2
(45) Date of Patent: Mar. 7, 2023

(54) METHOD AND SYSTEM FOR DATA DRIVEN MACHINE DIAGNOSTICS

(71) Applicant: Dodge Industrial, Inc., Oxford, CT (US)

(72) Inventors: Stefan Rakuff, Windsor, CT (US); Jinmiao Huang, Chongqing (CN)

(73) Assignee: Dodge Industrial, Inc., Oxford, CT (US)

( * ) Notice: Subject to any disclaimer, the term of this patent is extended or adjusted under 35 U.S.C. 154(b) by 1051 days.

(21) Appl. No.: 16/281,936

(22) Filed: Feb. 21, 2019

(65) Prior Publication Data
US 2020/0272139 A1   Aug. 27, 2020

(51) Int. Cl.
| | |
|---|---|
| G05B 23/02 | (2006.01) |
| G06N 3/084 | (2023.01) |
| G06N 3/04 | (2023.01) |
| G06F 17/14 | (2006.01) |
| G06F 30/23 | (2020.01) |

(52) U.S. Cl.
CPC ....... *G05B 23/0254* (2013.01); *G06F 17/142* (2013.01); *G06F 30/23* (2020.01); *G06N 3/04* (2013.01); *G06N 3/084* (2013.01)

(58) Field of Classification Search
CPC .................................................. G01M 99/005
USPC ................................ 340/686.3; 434/234, 224
See application file for complete search history.

(56) References Cited

U.S. PATENT DOCUMENTS

| | | | |
|---|---|---|---|
| 2015/0160101 A1* | 6/2015 | Gao | G01M 13/045 702/6 |
| 2015/0233792 A1* | 8/2015 | Gao | G01M 13/045 702/35 |
| 2018/0036964 A1* | 2/2018 | DehghanNiri | B29C 64/393 |
| 2019/0102880 A1* | 4/2019 | Parpara | B29C 33/3842 |
| 2020/0034956 A1* | 1/2020 | Machek | G06N 3/08 |

OTHER PUBLICATIONS

United Kingdom Intellectual Property Office, Search Report in United Kingdom Patent Application No. GB2001985.7, 1 p. (dated Jul. 22, 2020).
Gecgel et al., "Gearbox Fault Diagnostics Using Deep Learning with Simulated Data," *2019 IEEE International Conference on Prognostics and Health Management (ICPHM)*, IEEE 8 pp. (Jun. 2019).
Kusiak et al., "A Data-Driven Approach for Monitoring Blade Pitch Faults in Wind Turbines," *IEEE Transactions on Sustainable Energy*, 2(1): 87-96 (Jan. 2011).

* cited by examiner

*Primary Examiner* — Kiet M Doan
(74) *Attorney, Agent, or Firm* — Robinson & Cole LLP (57) ABSTRACT

A system for data driven diagnostics of a machine including a machine learning model instantiated in a computer, the machine learning model being configured to: receive operational data of the machine; and process the operational data to determine machine diagnostics information. The machine learning model is trained using simulated defect information received from a simulation environment.

18 Claims, 5 Drawing Sheets

METHOD AND SYSTEM FOR DATA DRIVEN MACHINE DIAGNOSTICS

FIELD

The present invention relates to a method and system for data driven machine (e.g., gear reducer) diagnostics.

BACKGROUND

A gear reducer is a mechanical device (i.e., a gearbox) that reduces the rotational speed and increases the torque generated by an input power source. Gear reducers are generally used to reduce an input speed to match a desired speed of a down-stream device and/or to provide a higher torque to get more usable work from an input power source. In its simplest form, a gear reducer achieves its intended effect by having an input gear drive an output gear that has more teeth than the input gear, causing the output gear to rotate more slowly. The gear with the smaller number of teeth (i.e., the smaller of the two gears) is called pinion.

There are a variety of types of gear reducers, including single-speed, industrial gear reducers, off-set reducers, in-line reducers, worm gear reducers, and planetary gear reducers, among others. Common applications for gear reducers include, use in conveyors, feeders, mills, mixers, roller beds, but many other applications are possible. In most applications, the gear reducer will be between a prime mover (e.g., an electric motor) and the driven equipment (e.g., the conveyor, feeder, mill, etc.). Gear reducers are used in a variety of industries, including the food processing, mining, and agricultural industries.

Regardless of the application or industry, unplanned down-time due to catastrophic gear reducer failure can be extremely expensive, for example, due to lost production. Catastrophic gear reducer failures can occur, for example, due to mechanical defects, such as breaking gear teeth, keys, or shafts. While, preventive maintenance and inspections can be performed regularly to reduce the probability of unplanned down-time of the gear reducer, this incurs undesirable labor costs, requires maintaining spare parts, and necessitates frequent scheduled down-times.

SUMMARY

An embodiment of the present invention provides a system for data driven diagnostics of a machine that includes a machine learning model instantiated in a computer, the machine learning model being configured to: receive operational data of the machine; and process the operational data to determine machine diagnostics information. The machine learning model is trained using simulated operational data from a defect simulation received from a simulation environment of the machine.

In an embodiment, the machine diagnostics information includes a prediction that at least one of a gear defect, a rolling element defect, or a shaft defect exists in the machine. The machine diagnostics information may include a prediction that a defect of at least one of the following categories exists in the machine: wear, scuffing, plastic deformation, Hertzian fatigue (i.e., surface fatigue), or cracking.

In an embodiment, the operational data is received from a single sensor associated with the machine. The single sensor may be an accelerometer or microphone.

In an embodiment, the machine learning model is a neural network. The neural network may be trained using back-propagation.

In an embodiment, the simulated operational data includes defect-sensor data pairs obtained from the simulation environment. Each of the defect-sensor data pairs can be obtained by simulating a defect to produce simulated sensor data corresponding to the defect.

In an embodiment, the simulation environment includes a structural dynamic finite element model of the machine.

The simulation environment, of an embodiment, can be configured to be updated based on information received about the machine being monitored to calibrate the simulation environment to the machine.

The machine learning model can be trained using at least one of historical data from machines similar to the machine, prototype test data, or historical data of the machine.

In an embodiment, the system further includes a data logger that is configured to store historical data of the machine.

In an embodiment, the system further includes a user interface that is configured to display the machine diagnostics information to a user.

In an embodiment, the machine is a gearbox. The gearbox can be a gear reducer.

Another embodiment of the present invention provides a method for data driven diagnostics of a machine. The method includes instantiating a machine learning model; training the machine learning model with simulated operational data from a defect simulation from a simulation environment of the machine; receiving, by the machine learning model, operational data of the machine; and processing, by the machine learning model, the operational data to determine machine diagnostics information.

In an embodiment, the method further includes: simulating, by the simulation environment, a plurality of defects to produce a plurality of simulated sensor data to obtain a plurality of defect-sensor data pairs; sending the defect-sensor data pairs to the machine learning model as the simulated operational data.

In an embodiment, the method further includes updating the simulation environment based on information received about the machine being monitored to calibrate the simulation environment to the machine.

In an embodiment, the machine diagnostics information includes a prediction that at least one of a gear defect, a rolling element bearing defect, or a shaft defect exists in the machine.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a method and system for data driven machine diagnostics utilizing numerical simulations and predictive machine learning algorithms. Methods and systems according to the present invention use a machine learning process and a numerical simulation to identify potential machine defects using signals from sensors (e.g., embedded sensors). While the present invention is described primarily in connection with a gear reducer, as would be recognized by a person of ordinary skill in the art, the invention is not so limited and inventive features apply to other types of gearboxes (e.g., speed increaser, differential, etc.) as well as other types of mechanical or electromechanical machines (e.g., turbochargers, turbines, compressors, pumps, generators, DC (direct current) motors, PM (permanent magnet) machines, brushed machines, induction machines, and the like).

Embodiments of the present invention enable early detection of defects in a gear reducer (e.g., prior to failure), thereby substantially reducing the risk of unplanned downtime of a mechanical system due to the inoperability of the gear reducer. For example, embodiments of the present invention may be used to identify potential defects within a gear reducer to prevent its catastrophic failure.

Advantages achieved by the present invention over the state of the art include reducing long-term operation costs, for example, by lowering the amount of required preventive maintenance, lowering replacement part costs (e.g., due to reduction of collateral part damage or early replacement of parts), and preventing unplanned and/or extended downtime of the system.

Embodiments of the present invention also provide technical enhancements over the state of the art. For example, traditional electronic-based fault detection is often limited to detecting substantial defects at (or just prior to) failure, which often requires immediate shutdown (even if a catastrophic failure is prevented), while embodiments of the present invention use machine learning (with data pair training) to predict a failure with a high probability; and thus, enable failure avoidance or mitigation by detecting defects substantially before failure, allowing for a planned shutdown of the system. Thus, when defects are detected by embodiments of the present invention, the gear reducer can be stopped or slowed down to prevent catastrophic failure. An overhaul/repair or replacement of the gear reducer can then be scheduled.

As another example, traditional electronic-based fault detection generally relies on detecting one of a multitude of sensor signals exceeding a given threshold (e.g., a known-good reference). However, while a fault may be detected, the root-cause of that fault remains unknown until the gear reducer is taken out of service and disassembled for inspection. Only then can it be decided whether a repair is feasible, what spare parts are needed, or whether a new gear reducer needs to be installed. This can cause significant (and costly) delay and downtime. Embodiments of the present invention, however, enable early identification of the root-cause of the fault. This early root-cause identification can happen while the gear reducer remains in service; and so, corrective action can be taken without significant impact to production and cost. Corrective actions include a planned shutdown for repair/overhaul, ordering of the correct spare parts, and continued operation of the gear reducer at a reduced speed/load. Additionally, embodiments of the present invention are capable of functioning using information from only one sensor, avoiding the cost of using the multitude of sensors required for traditional fault detection systems.

Embodiments of the present invention employ a machine learning model (such as a neural network) to detect defects in a gear reducer. This machine learning model enables detecting not only the existence of a fault, but also identifying the defect type or root-cause (e.g., bearing failure). According, by employing this machine leaning model, embodiments detect early warning signs (i.e., abnormal gear reducer operating characteristics) of the gear reducer, identify the type of defect on a component level, and then alert the appropriate decision makers of the condition so that corrective actions can be scheduled.

The machine learning model of the present invention can be trained with data pairs of known defects and corresponding sensor signals. The sensor signals are given in time domain and can be transformed to the frequency-domain using a discrete Fourier transform algorithm such as the FFT (Fast Fourier Transform). The training can be done through backpropagation of the neural network, but other training protocols are also possible. Through numerical optimization, the machine learning model can then learn a high dimensional non-linear mapping between the sensor signals and defects.

The accuracy of the machine learning model can be enhanced by training the model with a significant number of data pairs. The data pairs can be obtained using a numerical model of a gear reducer (e.g., a numerical simulation environment). This numerical model may be updated (e.g., periodically or continuously updated) to create a digital twin of the real world gear reducer. By updating the digital twin, the numerical model maintains (and/or converges to) a high degree of similarity to the gear reducer being monitored. Defects can be simulated in the numerical model to provide the data pairs used to train the machine learning model detecting actual faults of the gear reducer. New data pairs can be generated as the numerical model is updated.

The computer model used to generate the data pairs to train the machine learning model can be a finite element (FE) model capturing the structural dynamics of the gear reducer assembly. The FE model can be continuously calibrated and updated with real-world sensor data (e.g., to stay similar to its real world counter-part). Defects and sensor signals can be simulated in the FE model to create the data pairs to train the machine learning model. For example, gear tooth or bearing defects can be modeled using disturbance force inputs or time variant stiffness matrices, and the modeled sensor data can be extracted from the FE simulation results in both time-domain and frequency-domain to form a defect-sensor data pair for training.

Sensors appropriate for measuring information off the gear reducer can include accelerometers associated with the gears and/or the input or output shafts, stress and/or strain gauges associated with one or more shafts onto which gears are operating, noise sensors, temperature sensors, and others. Also, instead of multiple sensors, a single sensor (such as a 3-axis accelerometer) may be used and placed at a suitable location (such as central point of a main housing of the gear reducer). A single sensor may be used because effects of a defect in a particular component can propagate through the entire gear reducer system (e.g., kinematic components and static components).

The use of a numerical model (e.g., an FE model) to create data pairs for training is a technical enhancement over simpler machine learning models, which may only use actual sensor readings corresponding to historical machine conditions to train the machine learning model. Relying on a historical based approach, however, requires a large amount of failure data, which is often unavailable and/or difficult or timely to develop. Accordingly, while embodiments of the present invention can also train their machine learning model with historical and real-world fault data, the embodiments can provide a high accuracy fault detection without this data. The use of a numerical model, therefore, enables embodiments of the present invention to obtain a very high number of data pairs for training the neural network more efficiently than having to gather historical data.

Once trained, the machine learning model can output the probabilities for various defects that correspond to operational data received from sensor readings of the operating gear reducer. Examples of the types of defects that can occur—and, thus, can be detected or predicted using the systems and methods described herein, for example, for a gear reducer—include defects of the bearings, gears, or shafts. The defects can be of many different types and have many different root causes. Examples of defect types of the bearings and gears include wear, scuffing, plastic deformations, and Hertzian fatigue (i.e., surface fatigue). Examples of root causes for these defects include insufficient lubrication, corrosion, excessive loading, and the like. Inclusion of foreign material such as water or dust can also create conditions that adversely affect performance of the gear reducer.

Another advantage of the present invention is that it can be added to gear reducers already installed in the field, and the gear reducer does not necessarily need to be stopped for the detection mechanism of the present invention to be implemented. For example, embodiments of the present invention may use signals from sensors (or a single sensor in a preferred embodiment) added to the exterior of the gear reducer or use pre-existing sensors (e.g., those embedded within the gear reducer). The sensor signals are fed to a neural network or other type of machine learning models to detect, locate, and characterize the defect.

Embodiments of the present invention can be integrated with other technologies (e.g., Industry 4.0 and Internet of Things (IoT) technologies) used to monitor critical machines (such as large gear reducers). For example, embodiments may be integrated into a centralized electronic dashboard (or information hub) that can be used to analyze all information about the status and condition of various pieces of equipment. Production plan alternatives can then be centrally worked out if a certain machine (e.g., a gear reducer) shows signs of defects that could lead to a catastrophic failure.

Figure 1:
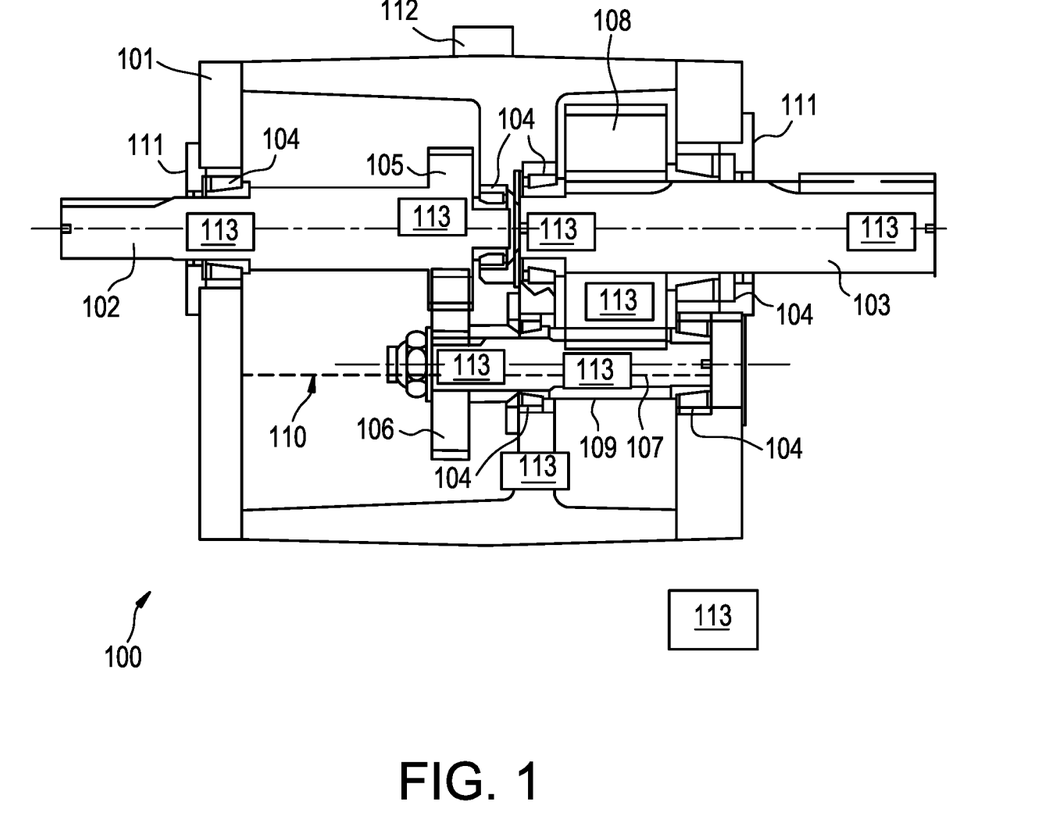
FIG. 1 illustrates an example embodiment of a gear reducer.

FIG. 1 illustrates an example of a gear reducer that can be monitored by the system and method of the present invention. The gear reducer 100 is a concentric gear reducer (i.e., with concentric input shaft 102 and output shaft 103). Embodiments of the present invention are not limited to a particular design of gear reducers, but can be applied to a variety of types and configurations of gear reducers (or other types of gearboxes and machinery).

The gear reducer has a housing 101 enclosing the kinematic components (e.g., shafts, gears, bearings, etc.) of the gear reducer 100.

The gear reducer 100 includes an input shaft 102 and an output shaft 103. These shafts (102, 103) are partially protruding out of the housing 101 so that they can be operatively coupled to other devices in operation.

In operation, the input shaft 102 may be operatively coupled to a prime mover (e.g., an electric motor) and the output shaft may be operatively coupled to driven equipment (e.g., the conveyor, feeder, mill, etc.). The gear reducer 100 is configured to reduce the rotational speed at the input shaft 102 to output a lower speed at the output shaft 200 and to increase the torque applied to the input shaft 102 to output a higher torque at the output shaft 103.

The gear reducer 100 includes a plurality of bearings 104. The bearings 104 are between the shafts (102, 103, 109) and the housing 101, and both translationally affix the shafts (103, 103) within the housing 101 and allow the shafts to rotate. The bearings 104 are typically rolling element bearings. There many different types of rolling element bearings such as tapered roller bearings, cylindrical roller bearings, and ball bearings.

Several gears (105-108) are affixed to the input shaft 102, an intermediate shaft 109, and an output shaft 103. The teeth of adjacent gears operationally mesh with each other such that the rotation of the input shaft 102 results in the intermediate shaft 109 and the output shaft also rotating 103. The gears (105-108) have particular characteristics, such as a radius and number of teeth. By adjusting the characteristics of the gears (105-108), various reductions in speed and increases in torque can be achieved. For example, if a first gear 105 has fewer teeth than a second gear 106, then the intermediate shaft 109 will have a lower rotational speed as compared to that of the input shaft 102. Further, if a third gear 107 has fewer teeth than a fourth gear 108, then the output shaft 103 will spin at a lower rotational speed as compared to that of both the intermediate shaft 109 and the input shaft 102.

The housing 101 may also contain oil for lubrication and cooling the kinematic components of the gear reducer 100. The oil will be filed to a defined oil level 110. Seals 111 are located at the openings for the input shaft 102 and the output shaft 103 to seal the interior of the housing.

Each of constituent components of the gear reducer can have mechanical defects, which can result in a failure of the gear reducer, including a minor failure (e.g., a reduction in operating performance) and a catastrophic failure (e.g., a failure which results in the complete loss of function). Such mechanical defects can develop over time (e.g., due to age, wear or cyclic stresses), or may be latent defects originating from the manufacture of the component or the assembly of the gear reducer. Furthermore, minor defects may grow to become more severe over time.

Gear reducers can fail catastrophically if defects within the gear reducer are not detected in time. A catastrophic gear reducer failure implies that the gear reducer is no longer able to function as intended, and mechanical power from a prime mover (e.g. an electric motor) can no longer be transmitted to a mechanical load (e.g., a conveyor belt or a pump). The catastrophic failure of the gear reducer can lead to a dangerous condition where the motion of a mechanical load can no longer be controlled.

Two of the main component categories in a gear reducer that often show signs of defects are the gears (such as, gears 105-108) and the bearings (such as, bearings 104).

Common categories of gear defects include wear, scuffing, plastic deformation, Hertzian fatigue, cracking and other surface damage (see e.g., ANSI/AGMA 1010-F14 describing these categories of gear defects, the entire contents of which is hereby incorporated by reference herein). Examples of failures originating from these defects include, gears developing a tooth root fracture that can lead to a broken gear tooth, or plastic deformation of gears that becomes sufficiently large so that gear meshing is no longer possible. Defects of most any type, however, can ultimately lead to catastrophic failure of the gear reducer. For example, fragments of failing defective components can cause a series of cascading events that result in further damage and ultimately lead to a catastrophic failure.

A similar set of defect categories can be defined for the rolling element bearings as well. Also, as with the gears, minor defects may develop into significant problems. For example, a rolling element bearing can have a small initial defect located on the inner bearing ring. In operation, the small defect can grow over time, cracks can form and move to the surface of the inner bearing ring, pieces of metal can separate, and the severely damaged inner bearing ring and the metal debris can cause bearing seizure.

Gears and bearings are not the only source of defects and device failure. For example, fatigue failure due to cyclic loading of the (rotating) shafts (such as shafts 102, 103, and 109) can also be a problem. The fatigue failure may develop as a fracture of the shaft, which can occur in areas of high stress concentrations (such as keyways, splines or corners). Another example includes misalignment of the motor and gear reducer input shafts that can lead to defects and eventual failure of the shaft coupling or the bearings due to high radial and axial loads, moment loads, and temperatures. Shaft seal failures and loss of oil can lead to problems from lack of lubrication. Lubrication problems can also occur with excessive heat or oil contamination.

Gear reducer defects (and failures) are often accompanied by other kinds of symptoms being expressed by the gear reducer (such as, excessive vibrations, acoustic emissions, abnormal temperatures, etc.). Embodiments of the present invention detect these expressions of symptoms, and make predictions about potential or existing defects in the gear reducer.

To detect the symptomatic expressions of defects in a gear reducer, operational data of the gear reducer is collected (e.g., continuously, periodically, or occasionally collected) by at least one sensor. For example, vibrations can be measured with accelerometers or laser vibrometers, acoustic emissions can be measured with microphones, and internal temperature can be measured with thermocouples or RTD. Also, oil sensors may be used to measure the oil fill level and the concentration of contaminants. Force and torque sensors may also be used. These sensors can be embedded in the gear reducer or mounted externally.

For example, the embodiment of FIG. 1, illustrates an external accelerometer 112 on the housing 101. It should be appreciated that the accelerometer 112 represents one possible type of sensor, which may alternatively or in addition be embodied as a stress, strain, temperature, noise and/or other type of sensor either individually or in combination with one or more other sensors into a sensor module 113. One or more sensor modules may be used. In the illustration of FIG. 1, additional sensor modules 113 are shown associated with the input and output shafts 102 and 103, to detect the condition of the shafts and also the bearings 104, the intermediate shaft 109, the gears 105-108, the housing adjacent the wall 114 that also supports the inner ends of the shafts 102 and 103, and other locations. In the illustrated embodiment, the accelerometer 112 measures vibrations (e.g., housing vibrations due to shaft vibrations, etc.). The bandwidth and sensitivity of the accelerometer 112 can be chosen so that the frequency of the gear mesh and the bearings can be captured. According to an embodiment of the present invention, only one sensor (such as the one accelerometer sensor 112 in FIG. 1) may be used to detect the operational data, while in other embodiments multiple sensors may be used.

A data acquisition system (DAQ) may also be used to collect operational data of the gear reducer. The DAQ can be part of an existing infrastructure that is already used in a plant to monitor or control other equipment.

In embodiments, sensors may be removable, and the operational data is then only taken at certain times (e.g., as part of a monthly/weekly inspection) rather than on a continuous basis as with other embodiments. Removable sensors might prove more feasible when the sensors are very expensive and/or only occasional measurements of the gear reducers performance is needed. However, permanently installed sensors may be feasible when the gearbox is of high value, the process is highly critical, and/or the cost of the sensors and electronics is relatively low.

The operational data is received by a machine learning model that is used to make predictions about the existence or likely future occurrence of a defect. In an embodiment, the machine learning model is a deep neural network (DNN), which is made up of multiple layers.

Figure 2:
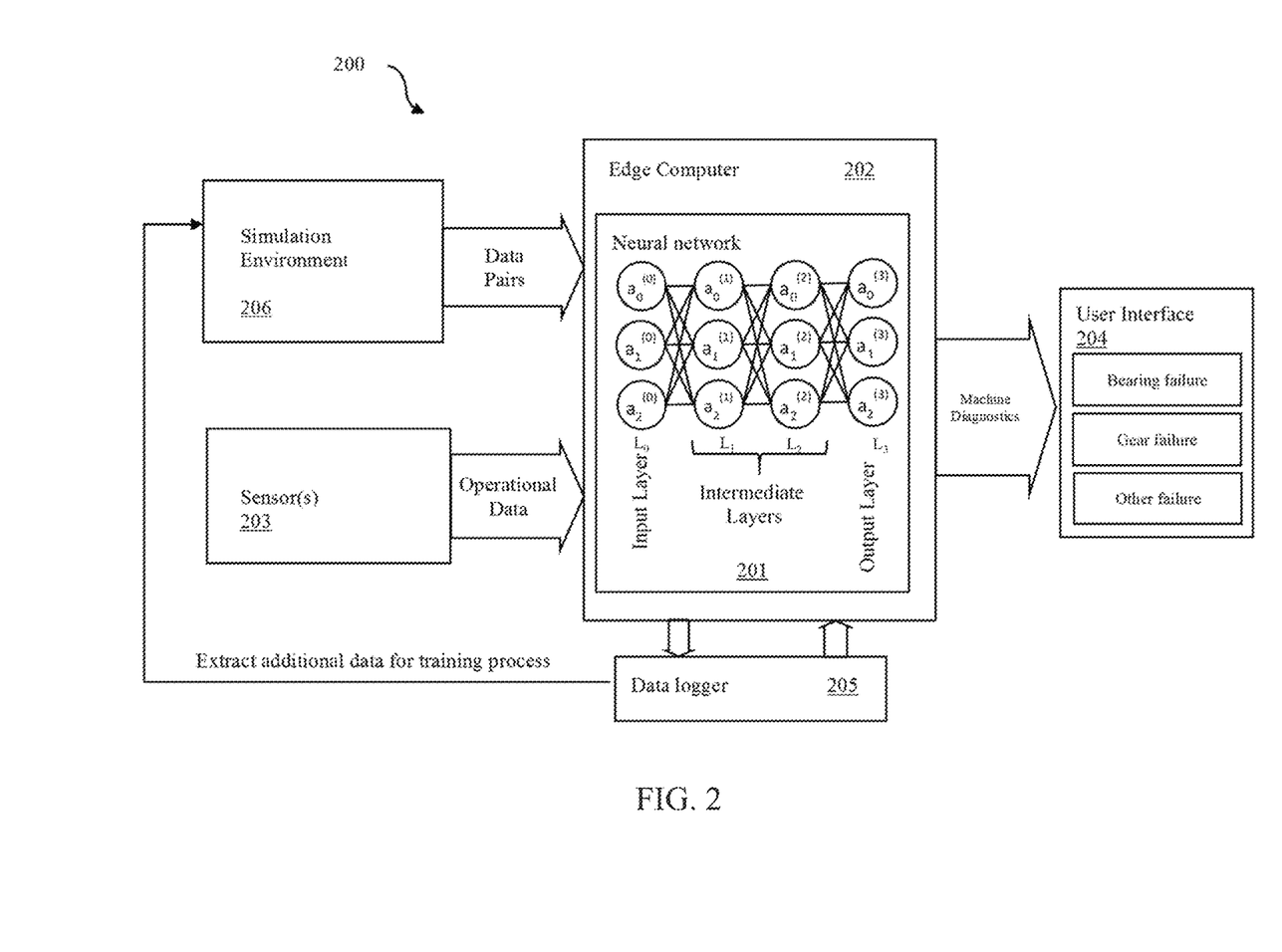
FIG. 2 a semi-diagrammatic illustration of a system and method of an embodiment of the present invention.
Figure 3A:
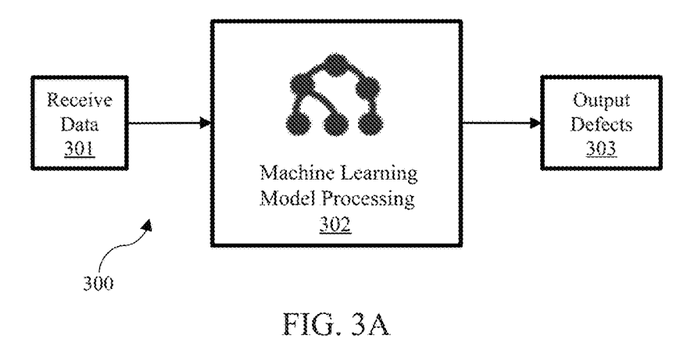
FIGS. 3A-3C further illustrate operations of the system and method of FIG. 2.
Figure 3B:
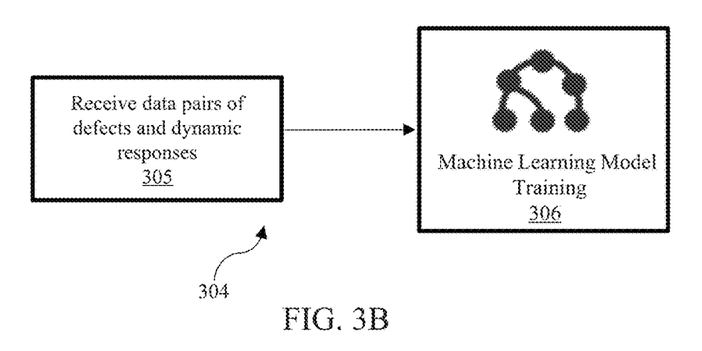
Figure 3C:
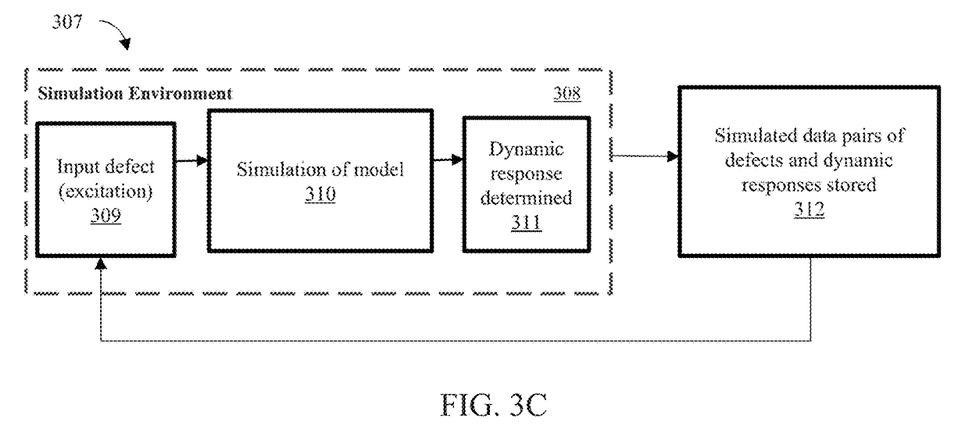

FIG. 2 is a semi-diagrammatic illustration of a system and method of an embodiment of the present invention. FIGS. 3A-3C further illustrate the defect detection (FIG. 3A), training (FIG. 3B), and data generation (FIG. 3C) operations of the system and method of FIG. 2.

FIG. 2 illustrates a machine learning model 201 instantiated in an edge computer 202 in a system 200 for monitoring a gear reducer. As shown in in FIG. 2 and FIG. 3A, the machine learning model 201 is configured to perform a machine learning diagnostic operation (300). In the machine learning diagnostic operation (300), the machine learning model 201 receives operational data from one or more sensors 203 associated with a target machine (e.g., a gear reducer in a preferred embodiment) (301), processes the operational data to make predictions on the existence and type of defect in the machine (302), and outputs the defect prediction (e.g., as part of machine diagnostic information) to a user interface 204 (303). The sensors 203 providing operational data may be embodied as sensors associated with the device such as the accelerometer 112 and/or one or more sensor modules 113, as shown in FIG. 1. The defect prediction may include a prediction of which component has a defect (e.g., bearing, gear, shaft, etc.) and/or what defect category is present (e.g., wear, scuffing, plastic deformation, Hertzian fatigue (i.e., surface fatigue), cracking, etc.). The machine learning model 201 may also output data on an equipment health condition, which can be stated differently as the absence of a predicted failure in a foreseeable future period.

The sensors 203 can be external or embedded in the monitored machine. The sensors may also be removable (e.g., portable). The sensors 203 may be connected to the edge computer 202 via any known means such as wired or wireless communication of information, and the like. Like the sensors 203, the edge computer 202 can be part of an existing and permanently installed infrastructure or a removable unit. The user interface 204 may also be included in the edge computer 202 or may be a separate device. The user interface 204 may be used to display the gear reducer health condition and potential defects (e.g., information about different bearings or gears, such as a display element indicating a bearing failure, a gear failure, or other failure). Displays relevant to the health condition of the gear reducer can be simplified such as using a green background while the device is operating within desired parameters, yellow when a failure or warning of a potential failure is present, and red when a failure is believed to be present.

The machine learning model 201 and/or the sensors 203 may communicate with a data logger 205. The data logger 205 stores historical data corresponding to the monitored machine (e.g., a gear reducer), including sensor data and defect information produced by the machine learning model 201. The data logger 205 can also store historical information related to devices other than the currently monitored machine. The data logger can be part of the edge computer 202 or may be a separate device such as a data acquisition system (DAQ).

The machine learning model 201 of FIG. 2 is a neural network (however, other machine learning models may be used). The diagram of the neural network shown in FIG. 2 is a simplified representation of an interconnected neural network.

In general, a neural network is loosely based on a biological brain, and has a collection of nodes (artificial neurons) that have connections (artificial synapses) to each other. The particular implementation of the network (or graph) is formed by connecting the output of certain nodes to the input of others through successive layers. The layers, nodes and synapses are implemented in software form, for example, as ordered matrices. Additionally, each connection between two nodes can be assigned a weight.

When a node receives a signal at its input, it performs a function on the signal on one layer, and sends the output to the other nodes to which it is connected, which may be on other layers. Because a node's input may be connected to multiple other nodes (or other external inputs), the input signal is a weighted average of the inputs received (the weights being defined by the weight assigned to each connection. Additionally, a bias term can be added to the total weighted sum of the inputs (e.g., to serve as a threshold to shift the nodes' function). The neural network may include predefined initial node functions, weights, and biases.

The nodes can be arranged into multiple layers, including an input layer and an output layer, with possible intermediate layers therebetween. Each layer can have multiple nodes. For example, in an embodiment of the present invention, the number of nodes in the input layer may correspond to the number of different response signals that are possible from the sensors. A pooling layer can be used in the intermediate layers to group similar sensor signals. The number of nodes in the output layer may correspond to the type of possible component defects that are to be differentiated.

Many different arrangements and dimensions of these various layers are possible. Indeed, the number of layers and number of neurons in the deep neural network may be tuned based on trial and error, and the best performing one is selected as the model for implementation as the machine learning model 201. For example, the neural network of the machine learning model 201 is a four layer network, with an input layer $L_0$, intermediate layers $L_1$ and $L_2$, and an output layer $L_3$. Each layer has three nodes $a_0$, $a_1$, and $a_2$.

The weights of the connections and the biases and functions of the nodes can be modified by a training process (i.e., learning) to configure or train the network to provide a favored output for a given input. A common training process employs a gradient descent, using backpropagation to compute the gradients. Backpropagation as used here is shorthand for "the backward propagation of errors," since an error is computed at the output and distributed backwards throughout the network's layers. During the training process, a training set of data may be used, with known inputs and desired outputs. Here, the neural network takes the input information and generates the output, and an error is determined based on the calculated output and the training output data. Weights, biases, and functions can be changed based on the error. Once sufficiently trained, a neural network will make a desired output for a particular input. As described in more detail below, in embodiments, the input can be sensor signals and the output a defect prediction. Simulated failures of a particular, preselected nature can be used to expedite the training process.

During normal operation of the gear reducer, multiple useful features can be extracted from the time-based sensor signals (e.g., output spectra and frequency responses in the frequency domain). The input to the neural network is the extracted features with some additional numerical process such as scaling, normalization, and standardization.

Prior to normal operation, however, the machine learning model 201 is "trained" in order to be able to accurately identify the component defects (i.e., make accurate predictions). FIG. 3B, illustrates a training operation 304, which includes the steps of receiving defect information as data pairs of defects and signal data (e.g., spectra or frequency responses) (305); and training the machine learning model on the received defect information (306). In an embodiment where the machine learning model is a neural network, the neural network training operation (306) may be a backpropagation process.

During training of the neural network machine learning model 201, its parameters are updated through optimization iterations to reach to the proper range. During the training process, the sensor signal and defects type both are the inputs (e.g., as defect-signal data pairs) to the neural network. The network parameters are updating iteratively until the loss between the predicted defect type (defined as a numerical value) and the ground grand-truth are smaller than a defined value.

According to an embodiment, the machine learning model 201 is trained with data pairs of known component defects and corresponding sensor signals. Through numerical optimization, the machine learning model then learns a high dimensional non-linear mapping between sensor signals and component defects. For accuracy, the training of the neural network requires large amounts of data pairs.

The data pairs may come from historical (real-world) data. For example, the data pairs may come from prototype test data, historical data of similar machines, or can be extracted from the logged operational history stored in the data logger 204.

Nevertheless, it can be very challenging to obtain enough real-world data to train an accurate model (e.g., due to the large number of possible operating conditions, reducer configurations, sensor types and sensor placements). Accordingly, embodiments of the present invention are also capable of being trained with simulated data pairs. Embodiments may even be primarily trained or initially solely trained on simulated data.

In an embodiment, a simulation environment 206 is used to model the dynamics of the gear reducer in the presence of various types of component level defects to get the data pairs for training. With this approach, a substantial number of data pairs can be generated and used for training the neural network. Moreover, a suitable number of data pairs required to train the machine learning model 201 can be obtained much more quickly than when relying only on historical data.

FIG. 3C illustrates an embodiment of an operation 307 for generating data pairs for training a machine learning model. First, a model (e.g., a numerical model) of the gear reducer is instantiated as the simulation environment 206 (308). Next, a defect is applied to the model (309). The defect can be applied, for example as a time varying periodic excitation force. In an embodiment, the applied defect will correspond to the effect of a particular defect of a particular component of the modeled machine. Next, the model of the machine simulates the operation of the machine under the defect condition (310), to determine a dynamic response corresponding to the applied defect (311). The dynamic response may be localized and be of the type that corresponds to a particular sensor type that is located onto the physical machine that the particular location onto which the dynamic response is modeled. For example, when an accelerometer such as the accelerometer 112 (FIG. 1) is mounted externally to the housing 101 to measure and provide a vibration signal, the model is configured to indicate an expected acceleration (amplitudes and frequencies) at the sensor location on the model. The input defect and determined dynamic response are then stored as a simulated defect-signal data pair (312). The operation 307 may then repeat the steps of inputting a defect (309), simulating the defect (310), and determining a dynamic response (311) until a suitable number of data pairs is obtained.

Additionally, the accuracy of the training data pairs (and thus the accuracy of the machine learning model 201) may be improved by updating (e.g., periodically or continuously update) the simulation environment 206 to better match the monitored device. That is, a digital twin of the real world gear reducer can be created and maintained. By updating the digital twin, the numerical model maintains (and/or converges to) a high degree of similarity to the gear reducer being monitored.

In an embodiment, the simulation environment 206 uses the Finite Element Method (FEM) to create the data pairs for training. For example, the FEM can model and simulate the dynamic response of the housing of the gearbox. In this simulated environment, a dynamic excitation source (force) can be placed at the different bearing seats. The magnitude, frequency and direction of the dynamic excitation force can be varied to simulate different bearing speeds and defect types. A forced vibration analysis is performed using the FEM to obtain the dynamic response at the theoretical location of an accelerometer that matches the physical location of the accelerometer used on the physical system.

Figure 4:
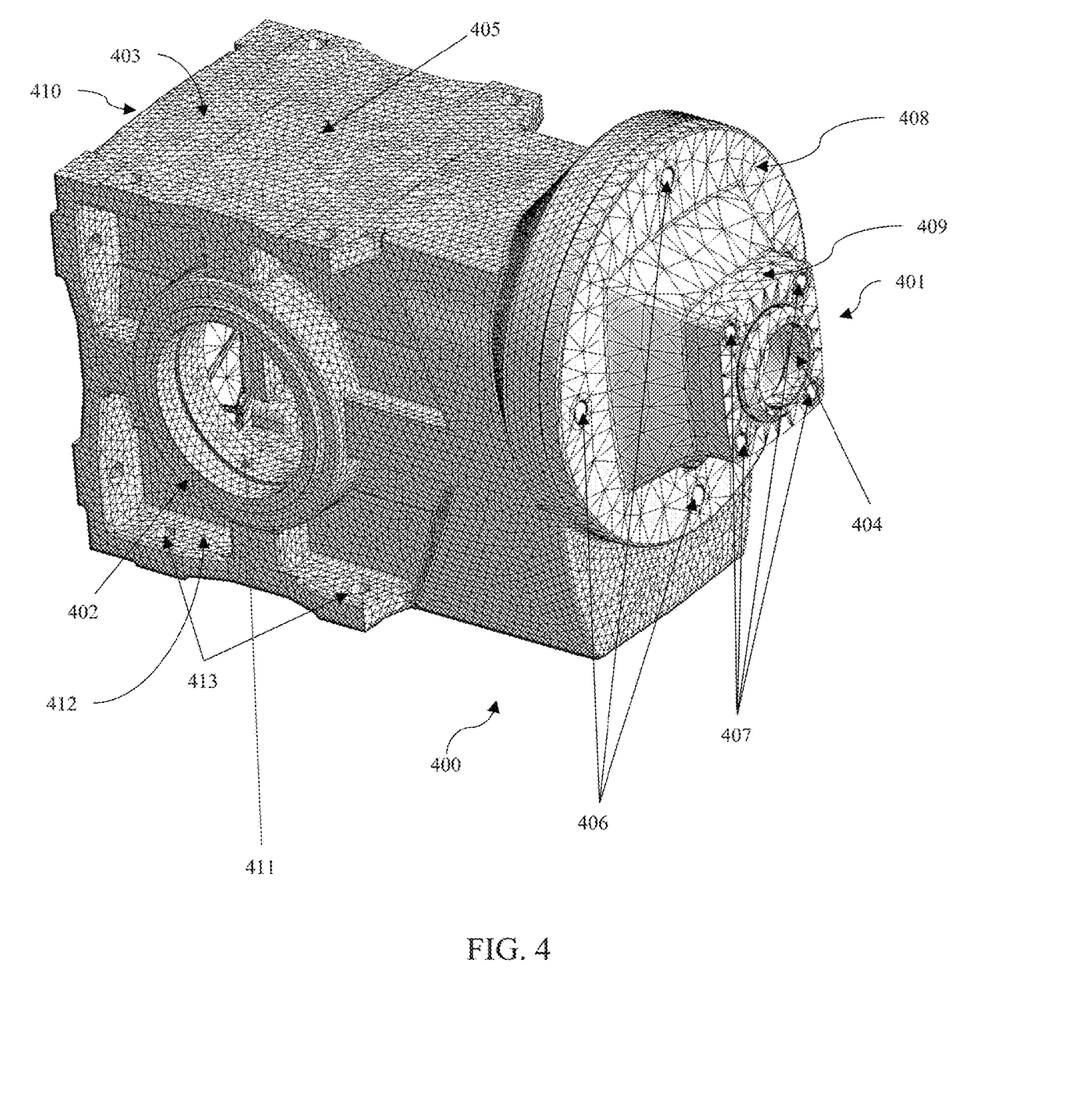
FIG. 4 illustrates an example of modeling and simulating a gear reducer according to an embodiment of the present invention.

FIG. 4 illustrates an example of modeling and simulating a gear reducer according to an embodiment of the present invention. In this example, only the housing of the gear reducer is modeled. The shafts, bearings, gears, and other components of the gear reducer are not modeled. Instead, the forces exerted on the housing by these components is applied to various surfaces (i.e., the bearing seats) on the housing as will be explained later.

FIG. 4 depicts a finite element (FE) model of a 2-stage helical-bevel gear reducer housing 400. The gear reducer housing model 400 has an input side 401 and an output side 402. The corresponding real world gear reducer has 3 shafts with 2 rolling elements per shaft that are not part of the model 400. The rolling elements of the real world reducer are supported by the housing at the bearing seats.

The housing model 400, as shown in FIG. 4, has four pieces that are bolted together. The pieces of the housing are the main housing 403, the input shaft housing 408, the input bearing plate 409, and the rear cover plate 410. The material of the housing pieces 403, 408, 409, and 410 may be modeled as grey cast iron, but cast aluminum alloys or plastics could also be used. The configuration of the gear reducer housing model 400 can be set to the equivalent of the real-world machine intended for diagnostic monitoring.

The FE model of the gear reducer housing 400 can be used to generate large amounts of training data. This FE model can be implemented, for example, in commercial FE software from ANSYS (ANSYS Mechanical) and many others. A FE model may use a numerical method for evaluating complex systems, including providing solutions in the form of displacements, velocities, and accelerations in response to applied forces and moments that are present in a machine system. The FE model generally divides a larger, complex system into smaller simpler parts called finite elements. The equations used to model the simpler finite elements are also simpler. These simpler equations are assembled into system of equations that models the complex machine system.

In the FE model of FIG. 4, the element type is mainly tetrahedral, and the element size is about 1% of the total length of the main housing 403. Bolted connections (e.g., bolted connections 406 and 407) are modeled using frictional contacts at the mating faces and preloaded beam elements with circular cross sections to represent the bolts. There are other possibilities to model bolted connections as well. The material model used is that of an isotropic linear elastic metal alloy. Displacement constraints can also be applied to a bottom surface of the main housing 403 where it is mounted (e.g., at mounting flanges 412 that are formed onto the main housing 403 which may have bolted connections 413 to affix to a mounting location). Many other modeling approaches are feasible as well.

To illustrate one exemplary method of obtaining training data pairs, consider the FE simulation environment applying dynamic excitation forces at the bearing seats in the radial direction. For example, a dynamic excitation force applied to the bearing seat 404 for the purpose of simulating a defect in a bearing for the high speed pinion shaft at the input side 401. In another example, a dynamic excitation force can be applied to the bearing seat 411 for the purpose of simulating a defect in a bearing for the output shaft at the output side 402. As a person of ordinary skill in the art would readily comprehend, many other simulations could also be performed, for example, by applying tangential (or any other direction) forces or applying forces to other parts. The FE simulation yields time varying displacements, velocities and accelerations (i.e., dynamic response) of the element nodes on the main housing's 403 surfaces, and from this a most suitable location 405 for an externally mounted sensor (e.g., an accelerometer) is identified. Actual vibration testing of the housing structure would be another way of identifying a preferred location for the accelerometer.

In the embodiment of FIG. 4, the location 405 for the sensor (e.g., accelerometer) is on top center of the housing 403. The sensor may be, for example, a triaxial accelerometer such as the PCB 356A15 IEPE accelerometer, which is mounted through a threaded stud or cyanoacrylate adhesives ("superglue"). Magnetic mounts are also possible, but those generally have a lower bandwidth. The FE model can then simulate the time varying displacements at this particular sensor location 405. A corresponding real-world gear reducer can include an actual equivalent sensor at this same location when being monitored by the above-discussed method.

The frequency of the excitation force used in the FE simulation environment to simulate a certain type of defect in a bearing is calculated from the number of rolling elements in the bearing and from the rotational speed of the shaft. For example, for the high-speed pinion shaft in the gear reducer, the input speed may be 1750 rpm and the number of rolling elements in one of the 2 bearings that support that shaft may be 8. In the present example, the resulting frequency of the excitation force is of about 230 Hz. Several radial directions and magnitudes are used for the excitation force, and each time the displacement response is calculated to generate the data pairs for training. The displacement response can be in time domain or in frequency domain. The process is repeated with other excitation frequencies for the other bearing locations and other types of defects. As a person of ordinary skill in the art would readily comprehend, many other calculations could be performed to calculate the frequencies of other defects such as defects of the gears or defects of the shafts. Transfer functions, or frequency response functions (FRF), are found that relate the excitation force at the bearings to a response at the location of the accelerometer. The applied excitation forces correspond then to a particular bearing defect and the displacement response correspond then to the simulated sensor data, and together define a defect-sensor data pair.

A machine learning model of the present invention is then trained with the data produced by the FE model and a sensor used for obtaining operational data is placed at the calculated location and in the same manner used for the simulation. After training, the machine learning model will be capable of detecting faults in the monitored gear reducer. Thus, an efficient mechanism for early fault detection is provided.

Figure 5:
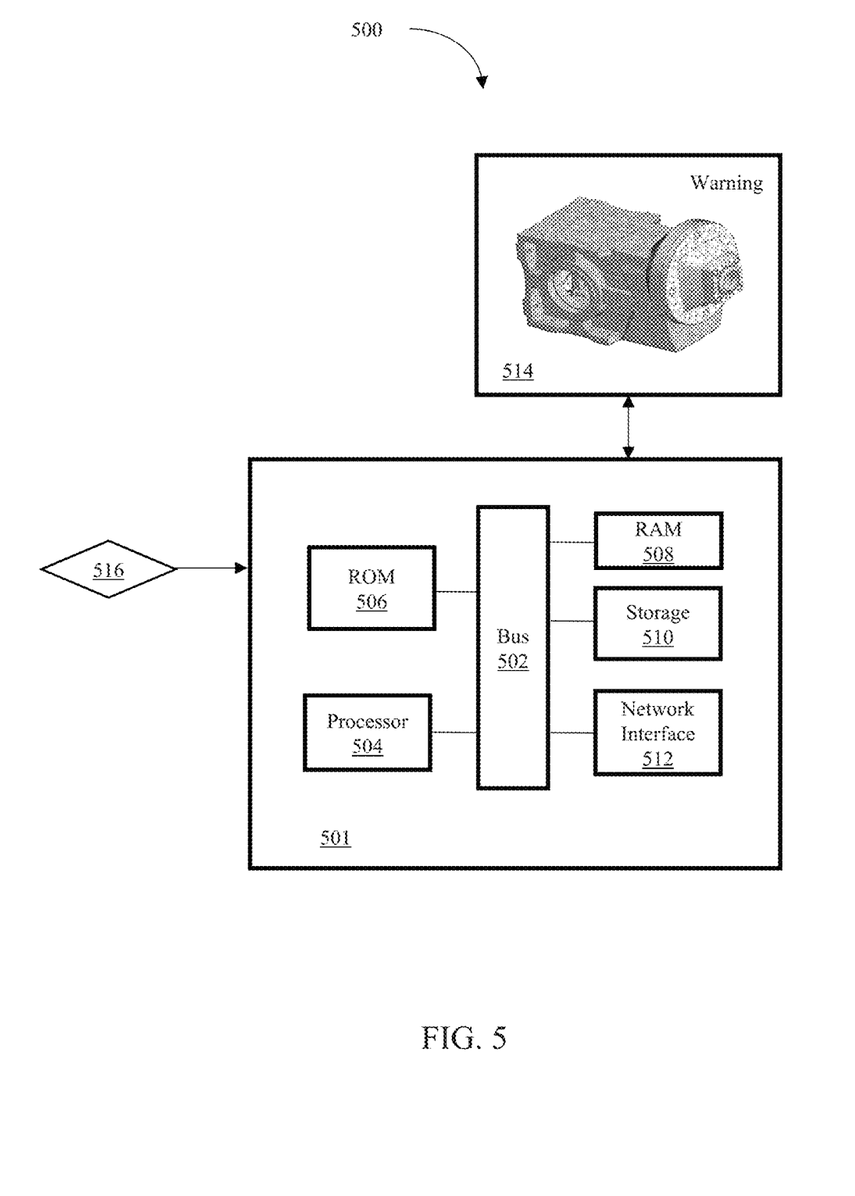
FIG. 5 illustrates a block diagram of a processing system according to an embodiment.

FIG. 5 is a block diagram of a machine diagnostics processing system according to an embodiment. The machine diagnostics processing system 500 includes a machine diagnostics computer 501 and a user interface 514.

The machine diagnostics computer 501 is configured to implement the data driven diagnostics systems and methods of the present invention. For example, the machine diagnostics computer can be configured to implement the edge computer 202, the simulation environment 206, and/or the data logger 205. The machine diagnostics computer 501 includes a processor 504, such as a central processing unit (CPU) of a computing device or a distributed processor system. The processor 504 executes processor executable instructions to operate embodiments of the systems of the present invention and/or to execute methods of the present invention. In embodiments, the processor executable instructions are locally stored or remotely stored and accessed from a non-transitory computer readable medium, such as storage 510, which may be a hard drive, cloud storage, flash drive, etc. For example, an embodiment of the present invention may store specialty computer software configured to implement the processor executable instructions to operate systems and/or execute methods of the present invention. Read Only Memory (ROM) 506 includes processor executable instructions for initializing the processor 504, while the random-access memory (RAM) 508 is the main memory for loading and processing instructions executed by the processor 504. The network interface 512 may connect to a wired network or cellular network and to a local area network or wide area network, such as the Internet.

The machine diagnostics computer 501 is in operational communication with the user interface 514 so that an operator can interact with the machine diagnostics computer 501. For example, the user interface 501 may display a warning alerting the operator of a defect in a monitored machine. This warning may include a specific indicator of where the particular defect can be found on the monitored machine, e.g., by highlighting a portion of a representation of the monitored machine with the defect. The user interface 514, in an embodiment, includes the user interface 204.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for data driven diagnostics of a gearbox, the system comprising:
    a gearbox comprising a housing, a first shaft and a second shaft each extending into and protruding outwardly from the housing, the first shaft being supported for rotation by a first bearing pair, the second shaft being supported for rotation by a second bearing pair, a third shaft disposed in the housing and being supported by a third bearing pair, a first gear disposed in the housing and mounted on the first shaft, a second gear disposed in the housing and mounted on the second shaft, a third gear and a fourth gear each mounted on the third shaft, the third gear meshing with the first gear and the fourth gear meshing with the second gear;
    a plurality of sensors each positioned in the housing; and
    a processor configured to run a machine learning model, the machine learning model being configured to receive operational data from at least one of the plurality of sensors, and process the operational data to determine diagnostic information of the gearbox,
    wherein the machine learning model is trained using simulated operational data from a defect simulation from a simulation environment of the gearbox,
    wherein the simulation environment comprises a finite element model of structural dynamics of the gear reducer and is configured to generate data pairs which comprise defect types and dynamic response signals, and
    wherein the learning model comprises a neural network that comprises an input layer that has a plurality of first nodes that correspond to the dynamic response signals, an intermediate layer configured to group similar sensor signals, and an output layer that has a plurality of second nodes that correspond to the defect types.

2. The system of claim 1, wherein the diagnostic information comprises a prediction that at least one of a gear defect, a rolling element defect, or a shaft defect exists in the gearbox.

3. The system of claim 1, wherein the diagnostic information comprises a prediction that a defect of at least one of the following categories exists in the gearbox: plastic deformation, surface fatigue, or cracking.

4. The system of claim 1, wherein the machine learning model is further configured to receive the operational data from an accelerometer or a microphone.

5. The system of claim 1, where the neural network is trained using backpropagation.

6. The system of claim 1, wherein the simulation environment is configured to be updated based on information received about the gearbox to calibrate the simulation environment to the gearbox.

7. The system of claim 1, wherein the machine learning model is trained using at least one of historical data from other gearboxes that are similar to the gearbox, prototype test data, or historical data of the gearbox.

8. The system of claim 1, further comprising a data logger configured to store historical data of the gearbox.

9. The system of claim 1, further comprising a user interface configured to display the diagnostic information to a user.

10. The system of claim 1, wherein the plurality of sensors comprises at least one gear sensor.

11. The system of claim 1, wherein the plurality of sensors comprises at least one bearing sensor.

12. The system of claim 1, wherein the plurality of sensors comprises at least one shaft sensor.

13. The system of claim 1, wherein the machine learning model is further configured to predict, based on the operational data, an absence of a failure of the gearbox for period of time.

14. A method for data driven diagnostics of a gearbox, the method comprising:
providing a gearbox comprising a housing, a first shaft and a second shaft each extending into and protruding outwardly from the housing, the first shaft being supported for rotation by a first bearing pair, the second shaft being supported for rotation by a second bearing pair, a third shaft disposed in the housing and being supported by a third bearing pair, a first gear disposed in the housing and mounted on the first shaft, a second gear disposed in the housing and mounted on the second shaft, a third gear and a fourth gear each mounted on the third shaft, the third gear meshing with the first gear and the fourth gear meshing with the second gear;
providing a plurality of sensors each positioned in the housing;
training a machine learning model with simulated operational data from a defect simulation from a simulation environment of the gearbox;
receiving, by the machine learning model, operational data from at least one of the plurality of sensors; and
processing, using the machine learning model, the operational data to determine diagnostic information of the gearbox,
wherein the simulation environment comprises a finite element model of structural dynamics of the gear reducer and is configured to generate data pairs which comprise defect types and dynamic response signals, and
wherein the learning model comprises a neural network that comprises an input layer that has a plurality of first nodes that correspond to the dynamic response signals, an intermediate layer configured to group similar sensor signals, and an output layer that has a plurality of second nodes that correspond to the defect types.

15. The method of claim 14, further comprising:
simulating, by the simulation environment, a plurality of defects to produce a plurality of simulated sensor data to obtain the data pairs; and
sending the data pairs to the machine learning model.

16. The method of claim 14, further comprising updating the simulation environment based on information received about the gearbox to calibrate the simulation environment to the gearbox.

17. The method of claim 14, wherein the diagnostic information comprises a prediction that at least one of a gear defect, a rolling element defect, or a shaft defect exists in the gearbox.

18. The method of claim 14, wherein the training, the receiving, and the processing are executed by a processor.

\* \* \* \* \*